F. R. BLAIR.
SHAFT COUPLING.
APPLICATION FILED JUNE 3, 1911.
1,012,506.
Patented Dec. 19, 1911.
2 SHEETS—SHEET 1.
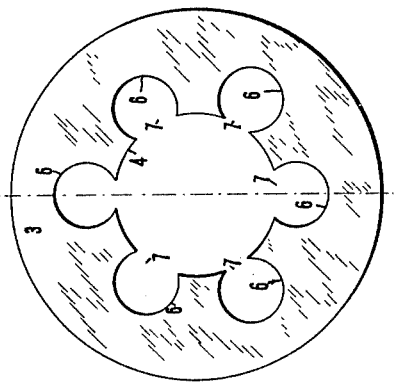
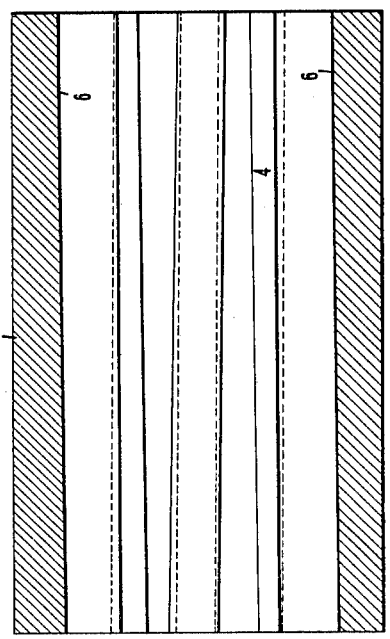
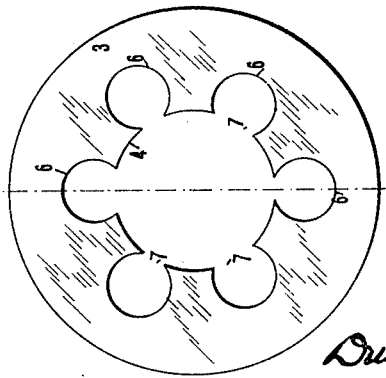
WITNESSES
INVENTOR
F. R. Blair
BY
Duell, Warfield & Duell
ATTORNEYS F. R. BLAIR.
SHAFT COUPLING.
APPLICATION FILED JUNE 3, 1911.
1,012,506.
Patented Dec. 19, 1911.
2 SHEETS—SHEET 2.
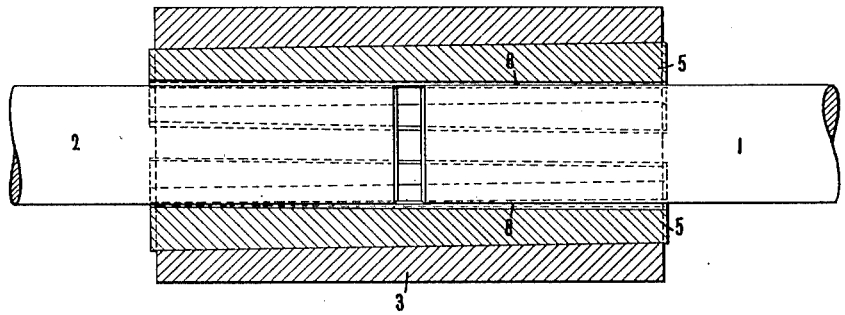
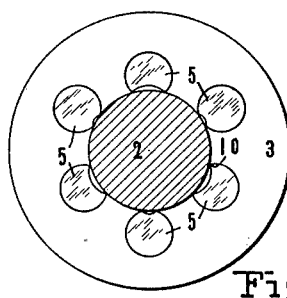 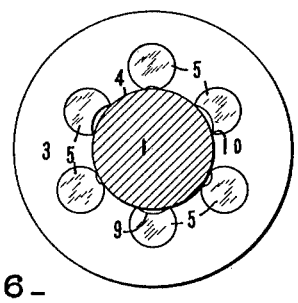
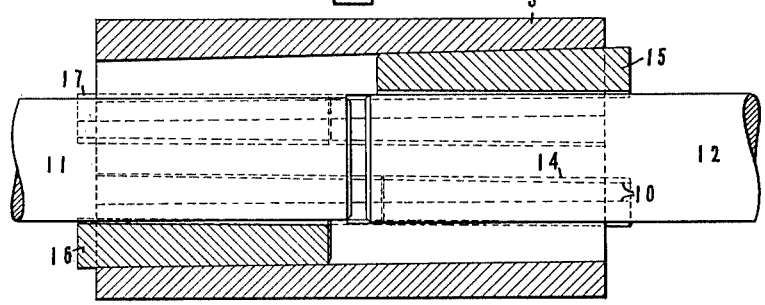
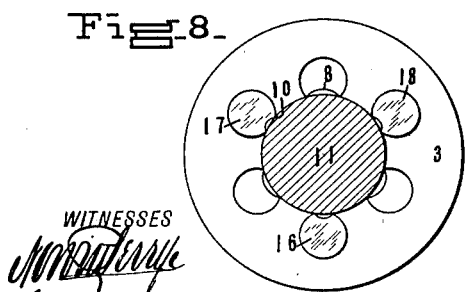 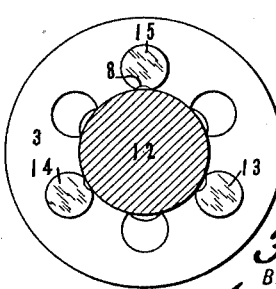
WITNESSES
INVENTOR
F. R. Blair
BY
Duell, Warfield & Duell
ATTORNEYS

UNITED STATES PATENT OFFICE.

FRANK ROSS BLAIR, OF GLEN RIDGE, NEW JERSEY.

SHAFT-COUPLING.

1,012,506.  Specification of Letters Patent.  Patented Dec. 19, 1911.

Application filed June 3, 1911. Serial No. 631,016.

*To all whom it may concern:*

Be it known that I, FRANK ROSS BLAIR, a citizen of the United States, residing at Glen Ridge, in the county of Essex and State of New Jersey, have invented certain new and useful Improvements in Shaft-Couplings, of which the following is a full, clear, and exact description, such as will enable others skilled in the art to which it appertains to make and use the same.

This invention relates to coupling devices, and more especially, to devices for coupling two separate rotatable shafts so that they may rotate as one.

One of the objects of the invention is the provision of an efficient coupling of simple construction and one which will establish a reliable connection between the elements to be joined.

Another object of the invention is the production of a shaft coupling comprising pins or keys which may be readily inserted or removed and efficiently prevent the elements to be coupled from slipping relatively to each other.

Still another object of the invention is the production of a shaft coupling of which the elements shall be simple in construction, and which may be made readily and inexpensively.

The invention accordingly consists in the features of construction, combinations of elements and arrangement of parts which will be exemplified in the construction hereinafter set forth, and the scope of the application of which will be indicated in the following claims.

Figure 1 represents a central section of the coupling block or sleeve; Fig. 2 is an end view of the sleeve; Fig. 3 is a view of the opposite end of the sleeve; Fig. 4 is a central section showing the sleeve and keys applied to two shafts of the same size; Fig. 5 is a view looking at one end of Fig. 4; Fig. 6 is a view looking at the other end of Fig. 4; Fig. 7 is a view in section showing the manner of coupling shafts of different sizes; Fig. 8 is a view from one end of Fig. 6; Fig. 9 is a view from the opposite end of Fig. 6; and Figs. 10, 11 and 12 are plan and end elevations, respectively, of the key or pin.

In the preferred embodiment of the invention, as illustrated in the drawings, two cylindrical shafts 1 and 2 are axially alined with their ends adjacent each other, and a coupling element, block or sleeve 3, provided with a generally cylindrical bore 4, surrounds the ends of the shafts 1 and 2. Preferably, the sleeve has a cylindrical outer periphery, and the diameter of the cylindrical portions of its bore is but a little larger than the diameter of the shafts. A satisfactory clearance with a shaft of approximately two inches in diameter has been found to be five thousandths of an inch. In order to join or couple the shafts, pins or keys 5 are provided adapted to enter and be seated in keyways 6 in the sleeve. As all the keys and keyways or channels are similar in construction, a detailed description of one of each will suffice. In the preferred constructions, each keyway comprises a channel having a cylindrical wall and extending from end to end through the sleeve, the axis of the wall being disposed at a small angle to the axis of the cylindrical surface of the shaft to be joined to the sleeve and in the plane of the axis of the shaft, said channels being formed by boring a cylindrical opening from end to end through the sleeve, the cylindrical channel being so disposed as to intersect the bore of the sleeve throughout its length, thereby providing a keyway extending substantially longitudinally through the sleeve and opening laterally into the bore from end to end, as shown at 7.

The key or pin which is to be seated in the keyway or channel, above referred to, is so shaped as to rest upon the surface to be coupled and to closely fit the keyway when in coupling position, and in the preferred embodiment said key is of a generally cylindrical shape, its only departure from said shape being due to the provision of a substantially longitudinal inclined tapering slot or groove 8, preferably having a curved wall 9, the intersection of the wall of the slot and the cylindrical surface of the key providing biting edges 10, extending at an inclination to each other substantially longitudinally of the key and also inclined to the axis of the key. Preferably, the key is formed by providing a cylindrical pin of a size to fit the keyway of the sleeve and grinding or milling the slot or groove therein by applying to the surface of the cylindrical pin a cylindrical grinding surface arranged in the plane of the axis of the pin but inclined to said axis. Thus the biting edges of the key are located in the surface of an imaginary external cylinder corresponding to the forming cylinder. It will be understood that the character of the biting edges may be rendered more or less acute by suitable tools, if desired. By this construction a cylindrical key is produced which has a finger fit in the keyway in the sleeve and which may be readily inserted by hand into the keyway a distance dependent upon the inclination of the axis of the keyway to the surface of the shaft. It is designed that the key shall occupy a substantial length of the keyway so as to provide an extended bearing surface between the biting edges of the key and the shaft, and a small angle of inclination of the keyway is therefore preferred. The key, having been inserted in its way, as by hand, until its further easy progress is stopped, is struck with a suitable tool, such as a hammer, whereupon its further movement in line with its axis causes the edges formed by the intersection of its outer surface with the wall of the slot to bite into the surface of the shaft, thus establishing a strong and secure connection between the shaft and sleeve and preventing relative rotary movement of said parts.

As the keyways are inclined to the bore of the sleeve and intersect the same, the transverse periphery of each keyway gradually decreases and the lateral opening 7 gradually widens. In the embodiment illustrated the transverse section of the key also gradually decreases and the width of the groove 8 correspondingly increases, and the key is therefore designed to be inserted in the keyway with its smaller end, which corresponds to the wide portion of its groove, foremost, so that the narrow portion of the slot trails as the key is moved to its seat.

In the preferred form of key, wherein the biting edges are formed by the intersection of curved surfaces arranged with their axes inclined to each other, the biting edge will be curved longitudinally. But when the angle of inclination of the two surfaces which form said biting edge is small, the curvature will not be sufficient to offer undue resistance to the axial movement of the key. Furthermore, when the key is driven in an axial direction, with the apex of the angle between the biting edges trailing, the material of the shaft, besides being intersected by the biting edges, tends to crowd between the biting edges and form a close joint.

It will be noted that the specific embodiment of the invention above described provides a keyway of such transverse contour and a key provided with such a similar contour that when in position in the keyway it may be moved back and forth in line with its axis, and that its movement from one position to another is also along a line parallel to the elements of the bearing wall of the keyway, there being no substantial lateral displacement of the key and keyway. Furthermore, the curved or cylindrical surface of the key enables the biting edges to be formed by faces more or less obtusely related, the key thus offering a substantial thickness of metal in line with the strain. There is thus provided between the shaft and the sleeve a positive connection which is eminently suitable for the purpose of securing the shaft to the sleeve and the prevention of slip.

While a single key and keyway may be sufficient, under some conditions, to efficiently couple the parts, it is preferred to employ a plurality of keys, symmetrically disposed around the axis of the shafts, as illustrated in the drawings. In Figs. 1 to 6 the shafts to be coupled are of the same size and the sleeve 3 surrounds a substantial portion of each, keys being employed of a length to extend longitudinally of the sleeve a sufficient distance to engage the surfaces of each shaft. Preferably, also, each alternate pin is inserted from opposite ends of the sleeve, in order to preserve a uniform strength of sleeve at each end, the keyways being suitably and oppositely inclined for the purpose.

When shafts of different sizes, as 11 and 12, are to be coupled, it is preferred to employ a separate set of pins for each shaft, as shown in Figs. 7, 8 and 9, one set, 13, 14, 15, being inserted at one side of the sleeve to lock the shaft on that side, and the other set of pins, 16, 17, 18, being inserted from the opposite face of the sleeve to lock the other shaft. Preferably, also, the keyways extend from one end of the sleeve to the other, so that when it is desired to uncouple the shafts, a suitable tool may be inserted and the pin driven out.

The coupling comprising the symmetrically-disposed independently-adjustable keys provides for easily centering the shafts as well as a secure connection.

It will be observed that by the above-described construction, a coupling is provided which is exceedingly simple to manufacture, and by means of which elements may be coupled quickly, strongly and without requiring any particular skill. When the sleeve is in position on the shaft, the pins may be inserted in the keyways in only one position, and they automatically center themselves so that both biting edges are applied to the surface of the shaft.

That portion of the sleeve between the keyways provides abutments therebetween, the bore portions of which closely approximate the shaft, whereby the abutments are also adjacent the biting edges of the key when in gripping position and serve to reinforce the same.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. An apparatus of the character described, comprising, in combination, a sleeve, said sleeve having inclined keyways spaced around the bore thereof and having cylindrical walls intersecting the bore continuously from one end of the sleeve providing abutments between the keyways, and independent keys adapted to occupy the keyways and having cylindrical walls peripherally coextensive with the cylindrical walls of the keyways, and walls intersecting said cylindrical walls providing biting edges on the keys adapted to be reinforced by the abutments.

2. An apparatus of the character described, comprising in combination a sleeve, said sleeve having keyways spaced around the bore thereof oppositely inclined from and having cylindrical walls intersecting the bore continuously from the respective ends of the sleeve providing abutments between the keyways, and independent keys adapted to occupy the keyways and having cylindrical walls peripherally coextensive with the cylindrical walls of the keyways, and walls intersecting said cylindrical walls providing biting edges on the keys adapted to be reinforced by the abutments.

3. In an apparatus of the character described, in combination, a sleeve having keyways spaced around the bore, intersecting the bore continuously from a face of the sleeve at an angle to the bore, and having cylindrical walls, and independently adjustable keys having cylindrical walls adapted to be disposed in the key ways, said keys having a plurality of biting edges adapted on being seated to simultaneously grip a shaft in the bore and prevent relative rotative movement of the shaft, sleeve and keys, the portions of the sleeve between the keyways serving to reinforce the keys and resist the strain due to rotation of the shaft and sleeve in either direction.

4. In an apparatus of the character described, in combination a shaft, a second shaft adjacent the first shaft, a sleeve inclosing portions of each shaft, said sleeve comprising alternate keyways and abutments spaced around the shafts, the keyways being inclined toward the shaft and having cylindrical walls, and the abutments comprising bore portions closely adjacent the surface of the shafts, and keys comprising intersecting cylindrical walls providing a plurality of biting edges projecting from said keyways adjacent each abutment.

In testimony whereof I affix my signature, in the presence of two witnesses.

FRANK ROSS BLAIR.

Witnesses:
J. W. ANDERSON,
L. F. WATSON.

---

Copies of this patent may be obtained for five cents each, by addressing the "Commissioner of Patents, Washington, D. C."